United States Patent [19]

Lewis et al.

[11] 4,224,644
[45] Sep. 23, 1980

[54] METHOD AND APPARATUS FOR CONTROLLING A TAPE PLAYER/RECORDER FOR RETRIEVING AND PLAYING PRERECORDED INFORMATION

[75] Inventors: David E. Lewis, Orange; Victor Blum, Marina del Rey, both of Calif.

[73] Assignee: Videodetics Corporation, Anaheim, Calif.

[21] Appl. No.: 876,067

[22] Filed: Feb. 8, 1978

[51] Int. Cl.² .................. G11B 15/20; G11B 27/24
[52] U.S. Cl. .................. 360/72.2; 179/100.1 PS; 360/74.4
[58] Field of Search .................. 360/72, 71, 74, 83, 360/90, 93, 72.1, 72.2, 74.1, 74.4; 35/35 C; 179/100.1 PS, 100.1 TC, 100.1VC

[56] References Cited

U.S. PATENT DOCUMENTS

| | | | |
|---|---|---|---|
| 3,541,271 | 11/1970 | Joslow et al. | 360/72 |
| 3,714,382 | 1/1973 | Sykes | 360/72 |
| 3,727,203 | 4/1973 | Crossman | 360/72 |
| 3,996,671 | 12/1976 | Foster | 360/72 |
| 4,000,518 | 12/1976 | Stearns | 360/74 |
| 4,014,039 | 3/1977 | Yasunaga | 360/72 |

Primary Examiner—Alfred H. Eddleman
Attorney, Agent, or Firm—Philip M. Hinderstein

[57] ABSTRACT

A method and apparatus for controlling a tape player/recorder for retrieving and playing prerecorded selections recorded thereon at spaced locations. According to the method and apparatus, the tape is played, a number indicative of tape position is generated, the tape position numbers indicative of the start and stop points for each selection recorded on the tape are stored in a memory, and the stored start and stop numbers for each selection are subsequently recorded on the tape whereby the tape may be removed from the player/recorder and subsequently reinserted into the same or another player/recorder. When a tape is inserted into a player/recorder, the start and stop numbers are read from the tape and stored in the memory whereupon the stored numbers may be utilized for locating selections on the tape to be played.

43 Claims, 2 Drawing Figures

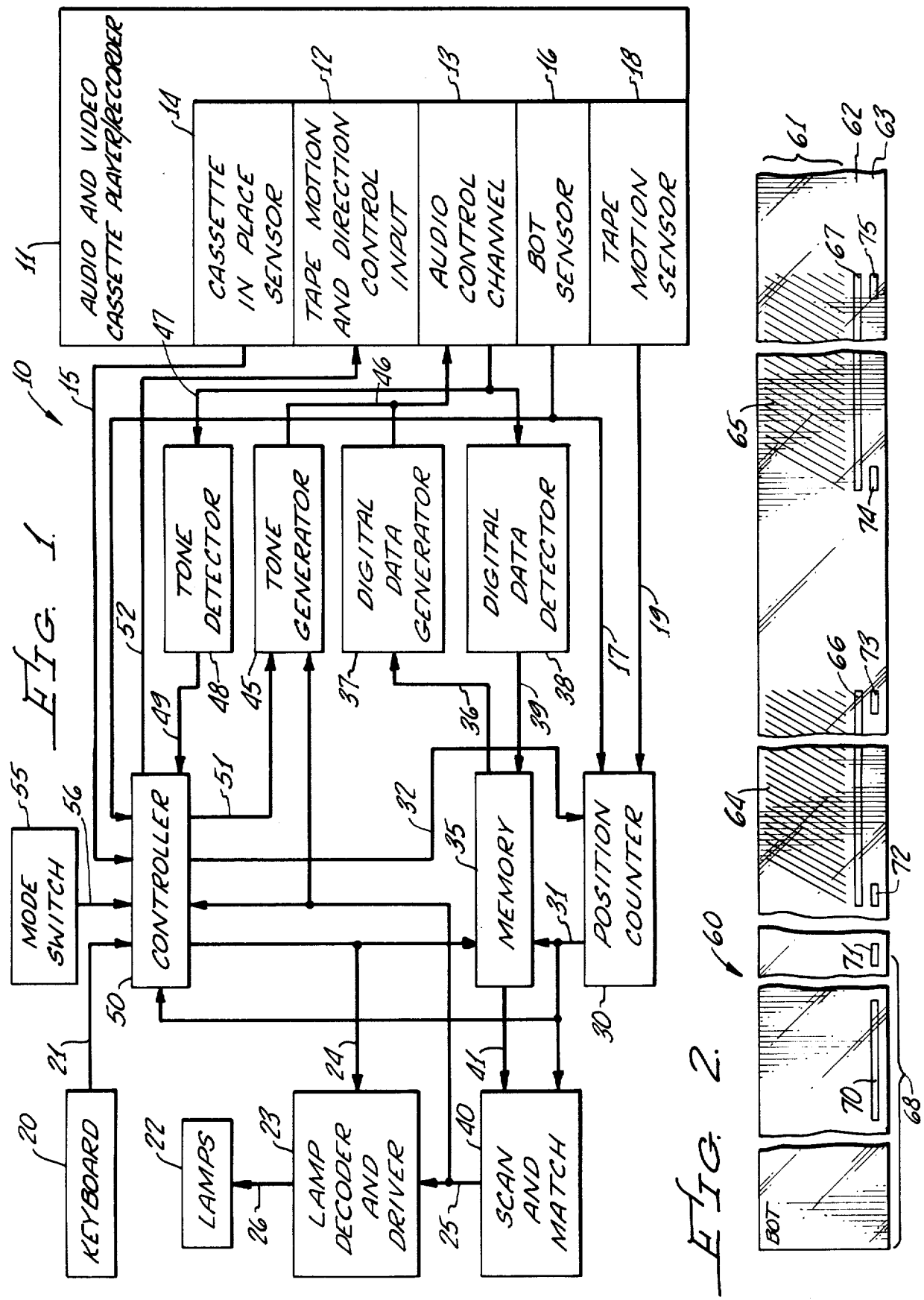

METHOD AND APPARATUS FOR CONTROLLING A TAPE PLAYER/RECORDER FOR RETRIEVING AND PLAYING PRERECORDED INFORMATION

BACKGROUND OF THE INVENTION

1. Field of the Invention

The present invention relates to a method and apparatus for controlling a tape player/recorder for retrieving and playing prerecorded information and, more particularly, to a controller which may be interfaced with either an audio or audio/video player/recorder for searching for and playing discrete tape segments on demand by an operator through the use of a separate control push button or a combination of push buttons for each desired segment or by means of a remotely generated command signal.

2. Description of the Prior Art

The development of standard types of cassettes for storing audio and video magnetic tape has greatly expanded the use of magnetic tape for prerecorded messages. Prerecorded cassette tapes are now widely used as teaching, training, and sales aides.

In the most common situation, a particular message, classroom lecture, sales program, training aid, or the like, is prerecorded on a cassette tape and the user listens to or watches the message on the tape from the beginning thereof so that there is no particular problem associated with the searching for a particular tape segment. However, it is often the case that the capacity of the tape cassette is much greater than the length of any one message and it is inefficient to limit each tape cassette to one message. Thus, in order to increase the versatility of audio and video playback as a teaching, training, and sales technique, it becomes desirable to prerecord a number of separate and distinct programs on a single cassette tape. For example, short segments of a continuous tape program can be used to illustrate a classroom lecture or a number of separate product messages can be recorded on a single cassette for use as a point of purchase or product demonstration sales tool.

The problem therefore becomes one of locating the desired program when a number of programs are prerecorded on a length of recording tape. In the past, it has become necessary to search for the program using a trial and error "look-and-see" searching technique. However, such a random back and forth searching technique has a number of disadvantages. In the first instance, a trial and error searching technique is frustrating and the unwanted images are distracting to the viewer. When used as a sales technique for visually demonstrating a product, the attention of customers is often lost due to fumbling with the equipment. The trial and error searching technique is time consuming and the repeated start and stop cycles subject a tape and a tape player to excessive wear and tear.

In U.S. Pat. No. 3,921,220, there is disclosed a remote control, electronic, random access, automatic apparatus for use with a standard tape player for locating and playing prerecorded messages on a tape. Numerical push buttons permit selection of any prerecorded message on the tape and the tape player automatically locates the program and initiates the beginning of the message. One can switch from one tape segment to another, in any random sequence, or a single segment can be repeated again and again. With such an automatic program locator, one can eliminate time consuming look-and-see searching. The tape player automatically advances or rewinds at fast speed and then starts the program at the exact position selected. By eliminating all back and forth searching, one avoids frustration, wear and tear on the tape and player, and the distraction of unwanted messages.

In order to automatically locate and play a prerecorded message on a tape with the system of said patent, one selects a first number which corresponds to the location of the prerecorded message on the tape, the first number being indicative of the desired number of revolutions of one of the tape reels from the beginning of the tape. A means coupled to the tape player senses the rotation of the one tape reel and generates a second number indicative of the actual number of revolutions of the one tape reel from the beginning of the tape. Upon comparing the first and second numbers and noting the absence of coincidence therebetween, the tape player can be signaled to advance or rewind, at high speed, in the direction to decrease the difference between the first and second numbers. Upon noting coincidence between the first and second numbers, the tape player can be signaled to automatically play the tape at normal play speed.

While such a system solves many of the problems associated with the location of a prerecorded message on a tape and the automatic initiation of the playing of such message, certain problems remain. Specifically, the operator must be provided with, along with the tape, a list containing the start numbers for each program selection recorded on the tape. The controller must be provided with a keyboard having the capability of manually inserting this number for comparison with the number indicative of actual tape position. It has been found that under many circumstances, this procedure is overly complex. That is, in many circumstances, it would be preferable simply to push a single button, or a pair of buttons, indicative of a particular selection and to have that selection play without the selection of a particular number associated with such selection. In such a case, the apparatus would function much like a jukebox, where the operator would simply push a button or buttons associated with a particular selection. This highly simplifies the nature of the operation.

Still further, it is desirable that the operator receive nothing with the tape other than the tape itself and, perhaps, a list of the selections thereon. The tape should contain all of the information necessary to permit the player to locate the messages simply upon the pushing of a button. That is, the tape should contain all of the information necessary to program the player without any extraneous apparatus such as a memory device associated with the tape to be placed into the player therewith. Such a simplified automatic, remote control, electronic, random access apparatus for locating a prerecorded message on a tape and for automatically initiating the playing of such message has been unavailable heretofore.

SUMMARY OF THE INVENTION

According to the present invention, there is provided a method and apparatus for locating prerecorded messages on a tape and for automatically initiating the playing of such messages which solves the problems discussed herein in a manner unknown heretofore. According to the present invention, a single push button or a combination of push buttons allows a user to select any segment or portion of a tape. Within seconds, and without touching the player or monitor, the desired message is located and begins. One can switch from one tape segment to another, in any random sequence, or a single segment can be repeated again and again.

The present system eliminates time consuming look-and-see searching. The tape player automatically advances or rewinds, at fast speed, and then starts the program at the exact position selected. By advancing directly to each new segment before threading, the apparatus eliminates most of the wear and tear that occurs with repeated start and stop cycles. The present system reduces tape and duplicating costs by allowing a number of programs to be combined in a single cassette. Furthermore, by eliminating all back and forth searching, one avoids frustration and the distraction of unwanted messages.

The present system provides a user with a high degree of flexibility. Once the various audio and/or video selections are recorded on a tape, at spaced locations, the user can play the tape and assign selection numbers to each program. After the start and stop points for each selection have been determined, all of the information necessary to identify such start and stop points is recorded right on the tape itself. Accordingly, thereafter, the tape can be removed from the player and duplicated. When a user receives the tape and places the tape into his player, the start and stop locations of the various selections may be read from the tape and stored in a memory so that all the user has to do is to push a single button or pair of buttons and the selection associated therewith will be located and played.

Briefly, the method of the present invention for controlling a tape player/recorder for playing a tape therein having a plurality of audio and/or video selections recorded thereon at spaced locations, said player/recorder including means for providing an indication of tape motion and direction, comprises the steps of playing the tape; generating from the tape motion and direction indication a number indicative of tape position as the tape is played; storing in a memory the tape position numbers indicative of the start and stop points for selections recorded on the tape; subsequently recording on the tape the stored start and stop numbers for the selections whereby the tape may be removed from the player/recorder and subsequently reinserted into the same or another player/recorder; reading from the tape the recorded start and stop numbers for each selection associated with each selection number; storing in the memory the read start and stop numbers; and utilizing the stored numbers for locating selections on the tape to be played.

Briefly, the apparatus according to the present invention for controlling a tape player/recorder for playing a tape therein having a plurality of audio and/or video selections recorded thereon at spaced locations, the player recorder including means for providing an indication of tape motion and direction and for generating a signal indicative thereof, comprises means responsive to the tape motion and direction indicating signal for generating a number indicative of tape position from a zero reference point; means for selecting any one of the audio and/or video selections; memory means responsive to the tape position number generating means and the selection means for storing the tape position number generated by the number generating means each time the selection means is activated, an operator activating the selection means at the start and stop numbers for each audio and/or video selection whereby the memory means has stored therein the start and stop tape position numbers for each selection; means for recording on the tape the start and stop tape position numbers stored in the memory means whereby the tape may be removed from the player/recorder and subsequently reinserted into the same or another player/recorder; means for reading from the tape the start and stop tape position numbers recorded thereon and for conducting the tape position numbers to the memory means for storage therein; means for comparing any start tape position number stored in the memory means and selected by the selection means with the tape position number generated by the tape position number generating means; and means responsive to the comparing means for commanding the player/recorder to locate the selected start tape position number.

It is therefore an object of the present invention to provide a method and apparatus for controlling a tape player/recorder for retrieving and playing prerecorded information.

It is a further object of the present invention to provide a controller which may be interfaced with either an audio or audio/video player/recorder for searching for and playing discrete tape segments on demand by an operator through the use of a separate control push button or buttons for each desired segment.

It is a still further object of the present invention to provide a method and apparatus for controlling a tape player/recorder in which all of the information for controlling the tape player/recorder is recorded on tape.

Still other objects, features, and attendant advantages of the present invention will become apparent to those skilled in the art from a reading of the following detailed description of the preferred embodiment constructed in accordance therewith, taken in conjunction with the accompanying drawings wherein:

BRIEF DESCRIPTION OF THE DRAWINGS

FIG. 1 is a block diagram of the present apparatus for controlling a tape player/recorder for retrieving and playing prerecorded information; and FIG. 2 is a schematic representation of a length of tape showing the manner in which information is recorded thereon.

DESCRIPTION OF THE PREFERRED EMBODIMENT

Referring now to the drawings and, more particularly, to FIG. 1 thereof, there is shown a block diagram of the present apparatus, generally designated 10, for locating prerecorded messages on a length of magnetic tape and for automatically initiating the playing of such messages. Apparatus 10 is designed for use with an existing cassette tape player/recorder 11, which may be an audio tape player but which preferably is a video cassette tape player. In the latter case, the output of tape player 11 would be conducted to a conventional T.V. monitor (not shown) for viewing the information recorded on the tape within tape player 11.

Tape player 11 includes a tape drive mechanism (not shown) including a tape drive capstan for contacting the magnetic tape and for transporting the tape from a supply reel to a take-up reel. Tape player 11 can receive a series of control inputs, at 12, for signaling stop, play, record, fast forward, fast rewind, etc. Tape player 11 also has an audio control channel 13 for receiving and playing back audio information to be recorded on such channel. Player/recorder 11 preferably includes a sensor 14 for generating, on a line 15, a signal indicating that a cassette has been positioned therein.

Apparatus 10 requires certain other signals indicative of the status of tape player 11 in order to provide an effective search/play sequence. Apparatus 10 requires a signal indicating that the tape has come to the beginning thereof (BOT) and tape player 11 includes a BOT sensor 16 which generates a BOT signal on a line 17. Apparatus 10 also requires a series of pulses which are proportional to tape motion and indicative of tape direction, apparatus 10 utilizing these pulses to increment or decrement a counter which will yield an output that represents a numerical equivalent of tape position expressed in a distance away from a known reference point. Accordingly, tape player 11 includes a tape motion sensor 18 which provides, on an output line 19, pulses which are proportional to tape motion. BOT sensor 16 and tape motion sensor 18 may be as described in the beforementioned U.S. Pat. No. 3,921,220.

Tape player 11 is preferably a Sony model SLO-320 video cassette tape player/recorder, the industrial version of the Sony Betamax series of video cassette tape player/recorders. No modification of such player/recorder is required for use in apparatus 10 in that such player/recorder has the inputs and outputs described herein on a remote control connector and adjacent audio input and output connections.

Apparatus 10 includes means 20 for selecting a desired prerecorded message on the tape in tape player 11. Means 20 may simply be a manual keyboard made up of a series of buttons and means associated with such buttons for generating, on a line 21, a signal indicative of which button or buttons have been pressed. For explanation purposes only, keyboard 20 will be described as including sixteen buttons, one for each selection, and this number will be used for the present example. Alternatively, if a large number of selections are recorded on a single tape, keyboard 20 could include two sets of buttons and the selection of one of each set would be required to make a program selection. Still further, program selection signals could be generated remotely by an external selection means, such as a computer. Keyboard 20 may be as described in U.S. Pat. Nos. 3,996,671 or 4,014,039.

Apparatus 10 also includes a plurality of lamps 22, one for each button on keyboard 20. Preferably, lamps 22 are mounted on keyboard 20 adjacent the buttons. Lamps 22 are controlled by a lamp decoder and driver 23 which receives, over a line 24 or a line 25, a signal indicative of which lamp is to be lit. Decoder and driver 23 interprets such signal and provides, over a line 26, a signal suitable for activating the selected lamp 22. Lamps and lamp driver circuits are known to those skilled in the art.

Apparatus 10 includes a position counter 30 which is simply a conventional pulse counter for counting the pulses received over line 19 from tape motion sensor 18 in tape player 11. As the tape moves through player 11, pulses appear on line 19 indicative of the tape motion and direction. These pulses increment or decrement counter 30 which provides, on a line 31, an output that represents a numerical equivalent of tape position. Position counter 30 receives inputs over line 17 from BOT sensor 16 and over a line 32, as will be described more fully hereinafter, to selectively reset counter 30 to a zero or other reference count. Position counter 30 may be a multiplicity of model 74191 pre-settable binary up/down counters of the type manufactured by National Semiconductor, Signetics, Texas Instruments, and others.

The output of counter 30 on line 31 is applied as one input to a memory device 35. Memory 35 is a conventional digital memory device having a series of storage registers for storing numerical equivalents of tape position, hereinafter referred to as tape position numbers. Specifically, memory 35 has sufficient storage capacity for storing the tape position numbers indicative of the start point for each selection recorded on a tape, the tape position numbers indicative of the stop point for each selection recorded on a tape, and a tape position number indicative of a "park" location. Since keyboard 20 is capable of selecting any one of sixteen programs, memory 35 has sixteen registers for start numbers, sixteen registers for stop numbers, and one register for a park number. Memory 35 is preferably a Motorola model 6810, 128 byte memory or equivalent or a memory as disclosed in U.S. Pat. No. 3,996,671.

Apparatus 10 also includes a scan and match circuit 40. Scan and match circuit 40 receives a first input over line 31 from position counter 30 and a second input over a line 41 from memory 35. Depending upon the mode of operation, as will be described more fully hereinafter, scan and match circuit 40 either compares the output of counter 30 with the number stored in a selected register in memory 35 or continuously scans the numbers stored in all of the registers in memory 35 and compares such numbers with the output of position counter 30 on line 31. In either event, scan and match circuit 40 provides a command output on line 25 which is based on the difference between its two inputs. The scanning portion of circuit 40 could be a conventional multiplexing system for sequentially conducting the outputs of all registers in memory 35 to one input of the matching portion of circuit 40. Multiplexing may be achieved by using a 74191 counter driven by a clock for sequentially addressing the address lines of memory 35, the outputs of the registers of memory 35 being applied to one input of the matching portion of circuit 40. The matching portion of circuit 40 could be a conventional magnitude comparator capable of providing, in response to two binary inputs, an equal to, a less than, or a greater than output. Such a magnitude comparator could be a Texas Instruments Incorporated part No. SN7485, a National Semiconductor part No. DM 7485, or equivalent or a comparator as described in the beforementioned U.S. Pat. No. 3,921,220.

According to a preferred embodiment of the invention, scan and match circuit 40 also provides on line 25 an output indicative of the fact that the number on line 31 is within a "window" (i.e. a range of numbers) before the number on line 41. Specifically, because the tape in player 11 can go forward or rewind at high speed, it is impractical to simply look for a match between the numbers on lines 31 and 41. It is preferable to look for coincidence between the number on line 31 and a range of numbers lower than the number on line 41. This permits player 11 to stop at a point prior to a desired number so that the tape can begin playing exactly at the desired number. This operation will be described more fully hereinafter and is readily achieved by using a pair of 7485 magnitude comparators comparing the number on line 31 with two different numbers before the number on line 41, the outputs of the two magnitude comparators being conducted to an AND gate which determines when the number on line 31 is within the window defined by the two magnitude comparators.

Apparatus 10 also includes a tone generator 45 which is capable of generating two different tones. For purposes of explanation, tone generator 45 generates either a 40 Hz tone or a 100 Hz tone, either tone appearing on a line 46 which is conducted to the audio control channel input 13 of player 11 for recording such tones on tape. During the play mode, such tones appearing at audio control channel 13 are conducted via a line 47 to a tone detector 48 which provides, on one or more lines 49, signals indicative of the fact that a 40 Hz tone or a 100 Hz tone has been detected. Tone generators and tone detectors are described in U.S. Pat. No. 4,000,518.

All of the digital data stored in memory 35 may be conducted over a line 36 to a digital data generator 37. Generator 37 is simply a conversion device capable of receiving the numbers stored in the registers of memory 35, in whatever format such numbers are stored, and converting such numbers into a train of data in a form suitable to be recorded on the audio control channel 13 of tape player 11. By way of example, memory 35 may store the tape position numbers in a binary format. A conventional multiplexing circuit could be utilized to sequentially apply each number to a parallel in/serial out shift register, such as a Texas Instruments Incorporated part No. SN74165 or equivalent. Multiplexing can be achieved as described previously utililizing a model 74191 counter to sequentially address all of the address locations in memory 35. The output data, encoded in accordance with a conventional NRZ format, would be converted to any one of the many self clocking codes. A suitable format converter is disclosed in U.S. Pat. No. 3,705,398.

The output of generator 37 is connected to line 46 together with the output of tone generator 45 for recording on tape. During the playing of tape by player 11, the data recorded thereon and detected on line 47 is conducted to a digital data detector 38 which performs the reverse operation performed by generator 37. That is, detector 38 receives the information from control channel 13 in whatever format it was recorded in and converts it into a format suitable for storing in the registers of memory 35. Accordingly, the output of detector 38 is conducted via a line 39 to memory 35. Digital data detector 38 may include a format converter as disclosed in U.S. Pat. No. 3,705,398 followed by a serial in/parallel out shift register, such as a National Semiconductor part No. DM 74164 or equivalent.

The operation of all of the before-described elements of apparatus 10 is under the control of a controller 50. Controller 50 is a conventional micro-processor of any one of the many types generally available which may be readily programmed to control the sequence of operation of the remaining elements of apparatus 10. Controller 50 may be either a motorola model No. 6800 or an Intel model No. 8080 micro-processor or equivalent. Controller 50 receives an input over line 21 from keyboard 20, an input over line 15 from cassette-in-place sensor 14, an input over line 17 from BOT sensor 16, an input over line 49 from tone detector 48, an input over line 25 from scan and match circuit 40, and an input over line 31 from position counter 30. Controller 50 provides an output over line 24 to lamp decoder and driver 23 and memory 35, an output over line 51 to tone generator 45, an output over line 32 to position counter 30, and an output over a line 52 to tape motion and direction control input 12 for controlling the operation of tape player 11.

Before describing the detailed operation of apparatus 10, such operation will be described briefly and summarized. Specifically, apparatus 10 provides a means for searching for and playing discrete identifiable selections recorded on a length of tape and this is done upon demand by the operator through the use of a separate button or a combination of buttons for each desired program. The end result is similar to that of a simple jukebox in which a multiplicity of buttons are provided and each button or buttons retrieves its corresponding audio or audio/visual program selection. Alternatively, program selection signals could be generated remotely by an external selection means, such as a computer.

Linear tape position can be computed based upon a measurement of linear tape motion and direction from a reference point. This reference point may be the beginning of tape or it might be a unique cue signature which is read from a point on the tape. Since player 11 includes a cassette-in-place sensor 14, controller 50 can rewind the cassette to the beginning of the tape point, as sensed by sensor 16, at which time position counter 30 can be set to a reference count, such as zero. Alternatively, or in addition, position counter 30 can be set by controller 50 by a signal over line 32. In any event, once a reference count is established for playback, the pulses on line 19 from motion sensor 18, which are proportional to tape motion and direction, will permit counter 30 to yield an output on line 31 that represents a numerical equivalent of tape position expressed in distance away from the reference point.

Memory 35 includes a series of storage registers which are related to the operator control buttons. Thus, upon the pressing of a button(s) on keyboard 20, a particular number can be called out to be compared by match circuit 40 with the tape position number of counter 30. This comparison can yield a greater than, less than, or equal output which may be used by controller 50 to effect an appropriate rewind, fast forward, or play command to player 11. It is also possible to high speed search for a point on tape which is slightly ahead of the objective, to stop at that point, to command play with the audio and/or video muted, and to switch on the audio and/or video when the numerical expression of the objective point matches the number called from memory by the push button or when a start tone is detected. A second number, which identifies the desired stop point, may also be called from the appropriate memory 35 when the button is initially pressed to begin the search. This stop number may be used, after play begins, to compare with the tape position counter 30 output so that a stop command, a new search command, or a command to return to a particular park location can be issued when the tape reaches that designated stop location or when a stop tone is detected.

As will be explained more fully hereinafter, apparatus 10 does include means for storing a number designated as a park location. This number can be used to establish a new search destination after an operator selected program has been completed. This search would logically end with a stop at the desired location. This means to always return to the same parking location after play reduces the maximum access time to rewind or fast forward to the extremity audio/visual segments if the park location is established near the tape center.

In order for a device such as briefly described above to be practically applied, it is essential that an economical and practical means be provided to introduce a new tape into player 11 and to establish the absolute numbers to be placed in memory 35 for a multiplicity of start and stop locations and at least one park location. Therefore, apparatus 10 includes a multiple position mode switch 55 connected to controller 50 via a line 56. In one position of mode switch 55, called the "enter" mode, an operator is allowed to enter actual start and stop addresses for each desired program selection into the memory locations related to the corresponding buttons on keyboard 20. In this mode, while the tape is being played, position counter 30 provides continuously updated tape location numbers. The operator may press any button(s) on keyboard 20, at any time, and store the prevailing tape position number on line 31 into the start memory for that button. A second activation of that same button stores the then prevailing tape location into the stop memory for that button. The lamp 22 associated with that button lights when storing the start address and extinguishes when storing the stop address. The effect of this feature is that all program material heard and/or viewed while the indicator light is lit will be the same program material played back when that same button is pressed in the automatic search and play mode.

Mode switch 55 has a position for "park address" entry. By selecting the park entry mode, a means to enter an address into that register can be enabled. Apparatus 10 can either enter the prevailing number on line 31 into the park address register when mode switch 55 is placed in the park address entry mode or, alternatively, when mode switch 55 is placed in the park address entry mode and any button on keyboard 20 is pressed, the output of the corresponding register can be recorded in the park address register.

Once the above procedure is completed, it becomes desirable to record the stored tape position numbers on the tape to which they relate instead of in controller 50 since power interruption would cause them to be lost and since the same controller 50 might be used with other tapes in the interim. To accomplish this, all of the memory contents in memory 35 can be organized into a serial digital data stream by data generator 37 and this data stream may be outputted in a format and bit rate which proves compatible with the audio control channel 13 in player 11. This data will be released at a predetermined time and be recorded on the front of the tape, after the very beginning and before the first tape location at which a segment start is desired.

Once the memory contents are safely recorded on tape, power can be removed and the cassette can be stored or copied for later use with the same or similar systems. With mode switch 55 in the "search and play" position, a properly preprogrammed tape can be inserted into player 11 with the following results. When controller 50 senses that a cassette is in place, it commands rewind to beginning of tape. After sensing beginning of tape, it commands play and waits for the serial digital data stream which was previously recorded near BOT on the cassette tape. The detected digital data stream is stored in memory 35 and apparatus 10 is then ready for selection of a program.

More specifically, with mode switch 55 in the enter mode, tape player 11 is under manual control. A tape is placed in player 11, such tape having a number of selections recorded thereon. With reference to FIG. 2, there is shown a length of tape 60 having a video track 61 and first and second audio tracks 62 and 63. Video track 61 has a series of program selections recorded thereon, such as program selections 64 and 65. Audio track 62 has the audio portions of selections 64 and 65 recorded thereon. Thus, audio track 62 has recorded, at 66, the audio portion of program selection 64 and has recorded, at 67, the audio portion of program selection 65. Audio control channel 13 records information on and receives recorded information from audio track 63.

In any mode, when cassette-in-place sensor 14 senses that a cassette has been placed in player 11, a signal is sent to controller 50 over line 15 and controller 50 signals player 11 over line 52 to rewind tape 60 to the beginning thereof. The beginning of tape signal on line 17 is applied to controller 50 and position counter 30. With the mode switch in the enter mode, such signal sets counter 30 and signals controller 50 to stop player 11. The beginning of tape position is shown on tape 60 in FIG. 2.

At this time, the operator can manually place player 11 in its play position. As tape 60 begins to play, pulses are received over line 19 from sensor 18 and counter 30 begins generating a number indicating tape position from BOT. According to the preferred embodiment of the present invention, the BOT point is preferably not used as the reference count for counter 30. The reason for this is that when the tape is duplicated, different lengths of tape may be used so that there is a variable spacing between BOT and the first program selection 64. Accordingly, when position counter 30 reaches another count, which count is sensed by controller 50 over line 31, controller 50 signals position counter 30 over line 32 to again reset its output on line 31. This reference position will be discussed more full hereinafter. Suffice to say that controller 50, in the enter mode, is programmed with an arbitrary number which defines the time that position counter 30 will be reset. The space between BOT and the reset point provides an area, indicated at 68 in FIG. 2, where digital data may be recorded on channel 63. This will be described more fully hereinafter.

Player 11, after being reset to a predetermined reference count, such as zero, continues to play the program selections on channels 61 and 62, which selections can be conducted to a monitor for viewing and listening. Assume for the moment that tape 60 has sixteen sequential programs recorded thereon. The purpose of the enter mode is to enter into the registers in memory 35 the tape position numbers associated with the start and stop points of each program selection. Specifically, with tape 60 playing and the operator observing the monitor, when the beginning of selection 64, presumably the first selection, is seen, the operator depresses any button or buttons on keyboard 20, the one or ones that will eventually be assigned to selection 64. When this button(s) is pushed, the corresponding lamp(s) 22 lights to tell the operator that he has hit that button(s). At this time, controller 50 determines by the input over line 21 which button(s) the operator has pushed and selects the register in memory 35 assigned to store the start tape position number for that button(s). Memory 35 receives the tape position number on line 31 and stores that number in the selected register. When the operator sees the end of program selection 64, he again pushes the same button(s). This causes controller 50 to store in the register in memory 35 assigned to store the stop tape position number for that button(s), the tape position number on line 31. At this time, the lamp(s) 22 for that button(s) is extinguished.

This procedure continues as tape 60 is played. As each program selection appears, the operator pushes a button which he wants to assign to that selection and the button is again pushed when the selection is completed. Accordingly, after the last selection on tape 60 has been played, the sixteen start position number registers and the sixteen stop position number registers have numbers stored therein.

Since it is possible that the number of program selections on tape 60 will be less than the number of register positions in memory 35, at the beginning of the enter mode, each register in memory 35 is initially loaded with a number which is outside of the range of valid tape position numbers. Therefore, during the enter mode, what is in effect taking place is the substitution of a valid number for the invalid number stored in the memory. At the end of the enter mode, some registers may still contain invalid numbers. If such a register is selected during the play mode, to be described more fully hereinafter, controller 50 will know not to operate on the command which retrieved such invalid number.

Furthermore, since controller 50 does not know whether a particular memory register contains a valid or an invalid number, the number can be changed at any time. That is, if the operator decides to change the number assigned to a particular selection, he can rewind tape 60, play it again, and repeat the procedure described above so as to change any number stored in any of the registers in memory 35.

Mode switch 55 has a position for entering a park tape position number or address. As mentioned previously, controller 50 may be programmed to operate in any one of many ways to enter a park address, such address providing a location for tape 60 to stop at during the play mode. Most conveniently, controller 50 may be programmed so that when mode switch 55 is placed in the enter park position, the pushing of any button on keyboard 20 will signal controller 50 to command memory 35 to store in the park register the tape position number stored in the start position register associated with such button. This permits the operator to select the start of the most commonly played selection as the park position. Alternatively, during the playing of tape 11 in the enter mode, controller 50 may be programmed so that if mode switch 55 is momentarily switched to the enter park position, the output of position counter 30 on line 31 would be stored in the park position register.

After the start and stop tape position numbers and the park tape position number have been entered in the registers in memory 35, mode switch 55 may be placed in the record position. In this mode, the information stored in memory 35 is recorded on tape 60, specifically on track 63, at 70. With reference to FIGS. 1 and 2, when the record mode is entered into, tape player 11 will first be manually signaled to rewind tape 60 to BOT. When tape 60 reaches BOT, the operator switches tape player 11 into its record and play position. Thereafter, the operation of player 11 is fully under the control of controller 50.

When sensor 16 senses BOT, position counter 30 is set. As tape 60 begins to play, position counter 30 begins counting pulses on line 19. Controller 50 determines a point where the data stored in memory 35 is to be written on tape 60. This point would be a predetermined count within area 68, between BOT and the reset point discussed previously. When this count is reached, controller 50 signals memory 35 to conduct the contents of each of the memory registers, in some predetermined order, over line 36 to digital data generator 37. Generator 37 converts this data to a format suitable for recording on audio channel 63 of tape 60 and conducts the data via line 46 to audio control channel 13. This data is then recorded on tape 60, in channel 63, as shown at 70. If player 11 does not have a separate audio track 63 in addition to track 62, the data could be recorded on track 62.

Tape 60 continues to play and the output of position counter 30 continues to be directed to controller 50. When counter 30 reaches a count previously defined as the reset count, two events occur. Controller 50 signals position counter 30 over line 32 to reset the count to a reference count, such as zero. In addition, controller 50 signals tone generator 45 over line 51 to generate a 100 Hz tone. This cue tone is conducted via line 46 to audio control channel 13 of player 11 to be recorded on channel 63, at 71, or on channel 62 if channel 63 doesn't exist. This subsequently becomes the reference point for tape 60 so as to eliminate variations in the length of portion 68 of tape 60.

At this time, player 11 is still in the record and play mode and tape 60 continues to move therethrough. During this time, scan and match circuit 40 is simultaneously comparing the output of position counter 30 on line 31 with the tape position numbers stored in all of the start and stop position number registers in memory 35. When the tape position number stored in any memory location matches the output of position counter 30, scan and match circuit 40 generates a signal on line 25. If the register location contains a start position number, controller 50 signals tone generator 45 to generate a 100 Hz tone, which is recorded on tape 60, at 72. At the same time, driver 23 is signaled to cause the corresponding lamp 22 to come on.

It should be evident that the first coincidence detected will always be a start position number. The next coincidence will be at a stop address and scan and match circuit 40 signals tone generator 45 via controller 50 to generate a 40 Hz tone which is recorded on tape 60, at 73. At the same time, driver 23 is signaled to extinguish the associated lamp 22.

This procedure repeats whereupon a 100 Hz tone will be recorded on tape 60, at 74, at the start of selection 65 and a 40 Hz tone will be recorded on tape 60, at 75, at the end of the same selection. During this time, all the operator has to do is to watch lamps 22 to confirm that all lamps 22 come on and subsequently go off and that the sequence is the same as the previously selected sequence. Accordingly, at the end of the record mode, when the end of tape 60 has been reached, written on portion 68 of tape 60, between BOT and the initial 100 Hz tone, at 71, is all of the information necessary to define the memory locations in memory 35, in a predetermined order, at 70. Following cue tone 71, there is recorded a 100 Hz tone at the start of every program selected and a 40 Hz tone at the end of every program selection. If channel 63 is not included, the start and stop tones would not be used.

After this mode has been completed, tape 60 may be taken out of player 11 and can be used as a master tape to record many other tapes. Furthermore, everything needed to play tape 60 under control of apparatus 10 is recorded on tape. Therefore, a user may place mode switch 55 in the play position, place tape 60 in player 11 and proceed with the playing of tape 60. Specifically, when tape 60 is placed in player 11, cassette-in-place sensor 14 signals controller 50 over line 15 that a tape has been inserted. Controller 50 signals player 11 over line 52 until BOT sensor 16 senses BOT and signals controller 50, simultaneously setting position counter 30. When controller 50 senses BOT, player 11 is signaled to go forward in the play mode. Tape 60 proceeds through player 11 and apparatus 10 awaits the receipt of the data on channel 63. Apparatus 10 is unconcerned with the position of the data and the length of portion 68. It simply waits for detector 38 to detect information on channel 63 (or 62).

Since the information from memory 35 was read out in a predetermined order, detector 38 knows the order in which to interpret the incoming data. As the data at 70 on channel 63 is received, it is conducted via line 39 to memory 35 and, under the control of controller 50, is stored into the appropriate storage registers. The end result is that memory 35 has the same data in the same positions as it did when the information was initially stored.

At the completion of the process of loading the data in memory 35, tape 60 continues to play until tone detector 48 detects the 100 Hz cue tone at 71. When this occurs, controller 50 is notified via line 49 and position counter 30 is reset via a signal over line 32. This completes the programming of apparatus 10 whereupon controller 50 signals memory 35 to read out the park location stored in the park location register. This park address number is compared by scan and match circuit 40 with the output of position counter 30 on line 31 and, based upon the comparison which appears on line 25, controller 50 places player 11 in the fast forward mode to run tape 60 until a match is achieved. When a match is achieved, tape 60 stops and apparatus 10 waits for an instruction from keyboard 20.

When an operator entry is made by pressing one or more of the buttons on keyboard 20, controller 50 finds the corresponding start position number in the associated register in memory 35 and causes such number to be conducted to scan and match circuit 40 for comparison with the output of position counter 30. The comparing electronics in circuit 40 determines if the desired position is ahead or behind the actual position and informs controller 50 which then generates either a fast forward or a rewind signal for player 11. When circuit 40 determines that the difference between the inputs on lines 31 and 41 is in the "window" a few numbers before the actual match position, controller 50 generates a play signal. While tape player 11 is placed in the play mode, an output from tape 11 to the T.V. monitor is preferably inhibited by controller 50 until detector 48 detects the 100 Hz tone indicating the start of the program. When the 100 Hz tone is detected, controller 50 signals player 11 to remove the muting signal to the T.V. monitor and the selection is played. Alternatively, controller 50 could signal player 11 when circuit 40 detects coincidence between its inputs, thereby eliminating the need for tone generator 45 and tone detector 48.

At this time, the observer can watch the selected program. When the 40 Hz tone at the end of the program is detected by detector 48, controller 50 finds the park address in memory 35 and the above procedure is repeated until player 11 finds the park address. Alternatively, controller 50 could command a search for the park address when circuit 40 detects coincidence between the output of counter 30 and the tape position number stored in the stop register for the selected program. In either event, when player 11 finds the park address, tape 60 stops, waiting for the next instruction. During this mode, controller 50 will be signaling driver 23 to light the lamp 22 associated with the button selected on keyboard 20. Typically, apparatus 10 can be programmed so that the associated lamp 22 will flicker while apparatus 10 is in the search mode, the lamp will come on full during the playing of the program and will go off when the program is over.

It can therefore be seen that according to the present invention, there is provided a method and apparatus for locating prerecorded programs on a tape and for automatically initiating the playing of such programs. According to the present invention, a single push button or a combination of push buttons allows a user to select any segment or portion of a tape. Within seconds, and without touching player 11 or the monitor, the desired program is located and begins. One can switch from one selection to another, in any random sequence, or a single selection can be repeated again and again.

Apparatus 10 provides a user with a high degree of flexibility. Once the various audio and/or video selections are recorded on a tape, at spaced locations, the user can play the tape and assign numbers to each selection. After the start and stop tape position numbers for each selection have been determined, all of the information necessary to identify such start and stop numbers is recorded on area 68 of channel 63 of tape 60. Accordingly, tape 60 can be removed from player 11 and duplicated.

A new tape may have a different length for area 68. However, when the user receives such tape and places it into his player 11, the start and stop tape position numbers of the various selections are read out from the tape and stored in memory 35. Furthermore, when cue tone 71 is detected, position counter 30 is reset to a reference count, insuring the accuracy of the tape position numbers. Thereafter, all the user has to do is to push a single button or a pair of buttons and the selection associated therewith will be located and played.

If the user decides, after a period of use, that the recorded park address is unsatisfactory, it is a simple matter to store a new park address. All the user has to do is to switch mode switch 55 to the park entry mode and push any desired button on keyboard 20. As explained previously, controller 50 will, under such circumstances, store in the park address register the start tape position number stored in the register associated with such button. Mode switch 55 may then be returned to the play position. Therefore, even though a different park address is recorded at 70 on tape 60, the new park address will be used until such time as tape 60 is removed from player 11 or power is removed.

While the invention has been described with respect to a preferred physical embodiment constructed in accordance therewith, it will be apparent to those skilled in the art that various modifications and improvements may be made without departing from the scope and spirit of the invention. Accordingly, it is to be understood that the invention is not to be limited by the specific illustrative embodiment, but only by the scope of the appended claims.

We claim:

1. Apparatus for use with a tape player/recorder having a tape therein having a plurality of audio and/or video selections recorded thereon at spaced locations, said player/recorder including means for providing an indication of tape motion and direction and for generating a signal indicative thereof, comprising:

means responsive to said tape motion and direction indicating signal for generating a number indicative of tape position from a known reference point;

means for selecting any one of said audio and/or video selections; and memory means responsive to said tape position number generating means and said selection means for storing the tape position number generated by said number generating means each time said selection means is activated.

2. Apparatus according to claim 1, wherein said tape motion and direction indicating signal is a series of pulses and wherein said tape position number generating means comprises:

a counter responsive to said pulses, said pulses incrementing or decrementing said counter as a function of tape motion and direction whereby the output of said counter is the numerical equivalent of tape position from said known reference point.

3. Apparatus according to claim 2, wherein said player/recorder includes means for providing a signal when said tape reaches the beginning thereof, and wherein said counter is responsive to said beginning of tape signal for setting said counter to a reference count.

4. Apparatus according to claim 3, further comprising: means responsive to said tape position number generating means for sensing when said tape position number reaches a predetermined count and for resetting said counter to a new reference count when said predetermined count is reached.

5. Apparatus according to claim 1, wherein said selection means comprises:

a series of buttons, activation of a single button or a pair of buttons being required to store in said memory means the tape position number generated by said number generating means.

6. Apparatus according to claim 5, wherein said memory means includes separate registers for storing a start tape position number and a stop position number for each one of said audio and/or video selections.

7. Apparatus according to claim 6, wherein said memory means includes a separate register for storing a tape position number defining a park location.

8. Apparatus for recording on tape information for controlling the tape when the tape is placed in a player/recorder, the tape having a plurality of audio and/or video selections recorded thereon at spaced locations, said player/recorder including means for providing an indication of tape motion and direction and for generating a signal indicative thereof, comprising:

means responsive to said tape motion and direction indicating signal for generating a number indicative of tape position from a known reference point;

means for selecting any one of said audio and/or video selections;

memory means responsive to said tape position number generating means and said selection means for storing the tape position number generated by said number generating means each time said selection means is activated; and means for recording on said tape at a predetermined central location, remote from said audio and/or video selections, the tape position numbers stored in said memory means.

9. Apparatus according to claim 8, wherein said recording means comprises:

means responsive to said tape position numbers stored in said memory means for converting said numbers into a stream of digital data, said digital data being conducted to said tape player/recorder for recording on said tape.

10. Apparatus according to claim 8, wherein said tape motion and direction indicating signal is a series of pulses and wherein said tape position number generating means comprises:

a counter responsive to said pulses, said pulses incrementing or decrementing said counter as a function of tape motion and direction whereby the output of said counter is the numerical equivalent of tape position from said zero reference point.

11. Apparatus according to claim 10, wherein said player/recorder includes means for providing a signal when said tape reaches the beginning thereof, and wherein said counter is responsive to said beginning of tape signal for resetting said counter to a reference count.

12. Apparatus according to claim 11, further comprising:

means responsive to said tape position number generating means for sensing when said tape position number reaches a predetermined count and for resetting said counter to a new reference count when said predetermined count is reached.

13. Apparatus according to claim 12, further comprising:

a tone generator for generating an audio tone of a predetermined frequency, the output of said tone generator being connected to said tape player/recorder for recording said tone on said tape, said tone generator being responsive to said position counter resetting means for generating said tone when said resetting means resets said counter.

14. Apparatus according to claim 8, further comprising:

means for comparing the tape position number generated by said tape position number generating means with all of the tape position numbers stored in said memory means and for generating a coincidence signal whenever there is coincidence therebetween; and a tone generator for generating an audio tone, the output of said tone generator being conducted to said tape player/recorder for recording said tone on said tape together with said recorded tape position numbers, said tone generator being responsive to said comparing means for generating said tone in response to said coincidence signal.

15. Apparatus according to claim 14, wherein said memory means includes separate registers for storing a start tape position number and a stop tape position number for each one of said audio and/or video selections.

16. Apparatus for controlling a tape player for playing a tape therein having a plurality of audio and/or video selections recorded thereon at spaced locations, said tape also having recorded thereon, at a predetermined central location, remote from said selections, a plurality of tape position numbers indicative of tape position from a known reference point, said tape position numbers being indicative of the start points of said selections, said player/recorder also including means for providing an indication of tape motion and direction and for generating a signal indicative thereof, comprising:

memory means for storing tape position numbers;

means for reading from said tape said tape position numbers recorded thereon and for conducting said tape position numbers to said memory means for storage therein;

means responsive to said tape motion and direction indicating signal for generating a number indicative of tape position from a known reference point;

means for selecting any one of said audio and/or video selections;

means for comparing any tape position number stored in said memory means and selected by said selection means with the tape position number generated by said tape position number generating means; and means responsive to said comparing means for commanding said player to wind or rewind said tape to locate the selected tape position number and for commanding playing of said tape when the selection associated therewith is located.

17. Apparatus according to claim 16, wherein said player includes means for providing a signal when said tape reaches the beginning thereof, and wherein said tape position number generating means is responsive to said beginning of tape signal for resetting the number generated thereby to a reference number.

18. Apparatus according to claim 16, wherein said tape also has recorded thereon an audio tone of a predetermined frequency at said reference point and wherein said apparatus further comprises:

means for detecting audio tones recorded on said tape and for generating a signal when a tone is detected; and means responsive to said signal generated when said tone is detected at said reference point for resetting the number generated by said tape position number generating means to a reference number.

19. Apparatus according to claim 16, wherein said selection means comprises:

a series of buttons, activation of only a single button or a pair of buttons being required to select any one of said audio and/or video selections.

20. Apparatus according to claim 16, wherein said tape also has recorded thereon an audio tone of a predetermined frequency at the start position of each audio and/or video selection recorded thereon and further comprising:

means for detecting audio tones of said predetermined frequency recorded on said tape and for generating a start signal upon the detection thereof, said commanding means commanding said player to wind or rewind said tape until the tape position number generated by said tape position number generating means is within a range of numbers before the selected tape position number and subsequently commanding playing of said tape when said start signal is detected by said tone detecting means.

21. Apparatus for controlling a tape player/recorder for playing a tape therein having a plurality of audio and/or video selections recorded thereon at spaced locations, said player/recorder including means for providing an indication of tape motion and direction and for generating a signal indicative thereof, comprising:

means responsive to said tape motion and direction indicating signal for generating a number indicative of tape position from a known reference point;

means for selecting any one of said audio and/or video selections;

memory means selectively responsive to said tape position number generating means and said selection means for storing the tape position number generated by said number generating means each time said selection means is activated;

means for recording on said tape at a predetermined central location, remote from said audio and/or video selections, the tape position numbers stored in said memory means whereby said tape may be removed from said player/recorder and subsequently reinserted into the same or another player/recorder;

means for reading from said tape said tape position numbers recorded thereon and for conducting said tape position numbers to said memory means for storage therein;

means for comparing any tape position number stored in said memory means and selected by said selection means with the tape position number generated by said tape position number generating means; and means responsive to said comparing means for commanding said player/recorder to wind or rewind said tape to locate the selected tape position number and for commanding playing of said tape when the selection associated therewith is located.

22. Apparatus according to claim 21, wherein said selection means comprises:

a series of buttons, activation of one or more buttons being required to locate a desired audio and/or video selection on said tape.

23. Apparatus according to claim 21, wherein said tape motion and direction indicating signal is a series of pulses indicative of tape motion and direction and wherein said tape position number generating means comprises:

a counter responsive to said pulses, said pulses incrementing or decrementing said counter as a function of tape motion and direction whereby the output of said counter is the numerical equivalent of tape position.

24. Apparatus according to claim 23, wherein said player/recorder includes means for providing a signal when said tape has come to the beginning thereof and wherein said counter is responsive to said beginning of tape signal for resetting said counter to a reference count.

25. Apparatus according to claim 21, wherein said memory means includes separate registers for storing a start tape position number and a stop tape position number for each one of said audio and/or video selections.

26. Apparatus according to claim 25, wherein said memory means includes a separate register for storing a tape position number defining a park location.

27. A method for recording on tape information for controlling a tape when the tape is placed in a player/recorder, the tape having a plurality of audio and/or video selections recorded thereon at spaced locations, said player/recorder including means for generating a signal indicative of tape motion and direction, comprising the steps of:

playing said tape;

generating from said tape motion and direction indicating signal a number indicative of tape position from a reference point as said tape is played;

storing in a memory means the tape position numbers generated by said number generating means and indicative of the start points for said selections recorded on said tape; and subsequently recording on said tape at a predetermined central location, remote from said audio and/or video selections, the tape position numbers stored in said memory means.

28. A method according to claim 27, wherein said step of recording on said tape comprises the steps of:
converting said tape position numbers stored in said memory means into a stream of digital data; and
conducting said digital data to said tape player/recorder for recording on said tape.

29. A method according to claim 27, wherein said player/recorder includes means for generating a signal when said tape reaches the beginning thereof, further comprising the step of:
setting the generated number indicative of tape position to a reference number when said tape reaches the beginning thereof.

30. A method according to claim 29, further comprising the step of:
sensing when the generated number indicative of tape position reaches a predetermined number and resetting said generated number indicative of tape position to a new reference number when said predetermined number is reached.

31. A method according to claim 30, further comprising the steps of:
generating an audio tone of a predetermined frequency; and
conducting said audio tone to said tape player/recorder for recording said tone on said tape when said generated number indicative of tape position is reset.

32. A method according to claim 27, further comprising the steps of:
comparing the generated number indicative of tape position with all of the tape position numbers stored in said memory means and generating a coincidence signal whenever there is coincidence therebetween;
generating an audio tone; and
conducting said audio tone to said tape player/recorder for recording said tone on said tape together with said recorded tape position numbers in response to the generation of a coincidence signal.

33. A method according to claim 32, further comprising the step of:
storing in said memory means the tape position numbers indicative of the stop points for said selections recorded on said tape.

34. A method according to claim 33, wherein said step of generating an audio tone comprises the step of:
generating audio tones of first and second different frequencies, said first frequency tone being generated when a coincidence signal is generated as a result of coincidence between the tape position number generated as said tape is played and a start tape position number stored in said memory means, said second frequency tone being generated when a coincidence signal is generated as a result of coincidence between the tape position number generated as said tape is played and a stop tape position number stored in said memory means.

35. A method according to claim 27, further comprising the steps of:

subsequently reading from said tape said recorded start tape position numbers for each of said selections;
storing in said memory means said read start numbers; and
utilizing said stored numbers for locating said selections on said tape to be played.

36. A method for controlling a tape player for playing a tape therein having a plurality of audio and/or video selections recorded thereon at spaced locations, said tape also having recorded thereon, at a predetermined central location, remote from said selections, a plurality of tape position numbers indicative of tape position from a known reference point, said tape position numbers being indicative of the start points of said selections, said player/recorder also including means for generating a signal indicative of tape motion and direction, comprising the steps of:
providing a memory means for storing tape position numbers;
playing said tape;
reading from said tape said tape position numbers recorded thereon as said tape is played and conducting said tape position numbers to said memory means for storage therein;
generating from said tape motion and direction indication signal a number indicative of tape position as said tape is played;
providing a means for selecting any one of said audio and/or video selections;
comparing any tape position number stored in said memory means and selected by said selection means with the generated number indicative of tape position; and
commanding said player to wind or rewind said tape to locate the selected tape position number and to play said tape when the selection associated therewith is located.

37. A method according to claim 36, wherein said player includes means for providing a signal when said tape reaches the beginning thereof, further comprising the step of:
setting the generated number indicative of tape position to a reference number when said tape reaches the beginning thereof.

38. A method according to claim 36, wherein said tape also has recorded thereon an audio tone of a predetermined frequency at said known reference point, further comprising the steps of:
detecting audio tones recorded on said tape; and
setting the generated number indicative of tape position to a reference number when said audio tone is detected at said reference point.

39. A method according to claim 36, wherein said tape also has recorded thereon an audio tone of a predetermined frequency at the start position of each audio and/or video selection recorded thereon, further comprising the steps of:
detecting audio tones of said predetermined frequency recorded on said tape; and
generating a start signal upon the detection of an audio tone of said predetermined frequency; and
wherein said commanding step comprises:
commanding said player to wind or rewind said tape until the generated number indicative of tape position is within a range of numbers before said selected tape position number; and commanding playing of said tape when said start signal is generated.

40. A method according to claim 39, wherein said audio tone recorded on said tape at the start position of each selection has a first predetermined frequency, wherein said tape also has recorded thereon an audio tone of a second predetermined frequency at the stop position of each selection recorded thereon, wherein said detecting step comprises:
   detecting tones of said first and second predetermined frequencies; wherein said generating step comprises:
   generating a stop signal upon the detection of an audio tone of said second predetermined frequency; and wherein said commanding step comprises:
   commanding that the playing of said tape be stopped when said stop signal is generated.

41. A method according to claim 40, wherein one of said tape position numbers recorded on said tape is a number defining a park location and wherein said commanding step comprises:
   commanding the comparing of said park tape position number with the generated number indicative of tape position when said stop signal is generated whereby said tape is wound or rewound to locate said park location.

42. A method according to claim 41, wherein said commanding step comprises:
   commanding the stop of said tape when said park tape position number is located until a new tape position number is selected by said manual selection means.

43. A method according to claim 36, wherein said tape position numbers recorded on said tape are also indicative of the stop points of said selections, wherein said comparing step first compares a start tape position number stored in said memory means and selected by said manual selection means, wherein after said tape is played said comparing step comprises the step of:
   comparing the stop position number stored in said memory means associated with the played selection with the generated number indicative of tape position; and wherein said commanding step comprises the step of:
   commanding said player to stop the playing of said tape when the generated number indicative of tape position is the same as said stop tape position number.

* * * * *